H. L. Wanzer,

Pitman Coupling,

No. 2,798. Reissued Nov. 12, 1867.

Witnesses;
Theo. Tusche,
Wm. Trum.

Inventor;
H. L. Wanzer,
Per Munn & Co
Attorneys.

AM. PHOTO-LITHO. CO. N.Y. (OSBORNE'S PROCESS)

United States Patent Office.

HIRAM L. WANZER, OF NEW YORK, N. Y.

*Letters Patent No.* 66,430, *dated July* 2, 1867; *reissue No.* 2,798, *dated November* 12, 1867.

IMPROVEMENT IN PITMAN-CONNECTION FOR HARVESTERS.

The Schedule referred to in these Letters Patent and making part of the same.

TO ALL WHOM IT MAY CONCERN:

Be it known that I, HIRAM L. WANZER, of 918 Broadway, in the city, county, and State of New York, have invented a new and improved Pitman-Connection for Harvesters; and I do hereby declare that the following is a full, clear, and exact description thereof, which will enable others skilled in the art to make and use the same, reference being had to the accompanying drawings, forming a part of this specification.

The object of this invention is to reduce the friction of the cutting apparatus and its connections on harvesters, and also to prevent the rattling of the said connections on their becoming loose by wearing.

The invention consists, first, in the mode of attaching the pitman-head to the pitman-wheel, which is done by an eccentric pin, in such a manner that, by turning the said pin, the length of stroke may be varied. Thus, without changing the speed of the pitman, the length of stroke, and consequently the velocity of motion of the cutting-bar can be changed at pleasure; thereby the machine will be adapted to different purposes.

The invention consists in the use of a pin having an eccentric projection. The pin is inserted in the pitman-wheel, and the pitman secured to its eccentric projection, so that by turning the pin, the end of the pitman can be brought nearer to or further from the centre of the pitman-wheel. I am aware that, for the same purpose, the pitman-wheel has been slotted, or been provided with a slotted arm in other inventions. But the pin which secures the upper end of the connecting-rod has in this case not bearing surface enough, and the slotted sides will not be sufficient to prevent it from moving in the wheel while used. In my device the pin has a sufficient bearing on all sides within the pitman-wheel, and does not weaken the same as the others do.

My invention also consists in the manner of connecting the cutting-bar to the pitman, so that the connecting-pin may be easily fitted up when worn, to prevent rattling. In the annexed drawing, my invention is illustrated—

Figure 1:
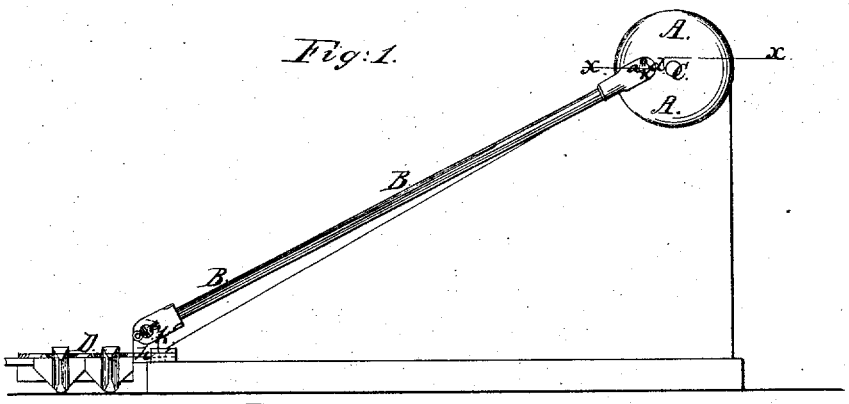

Figure 1 being a side elevation of the pitman-connection, and

Figure 2:
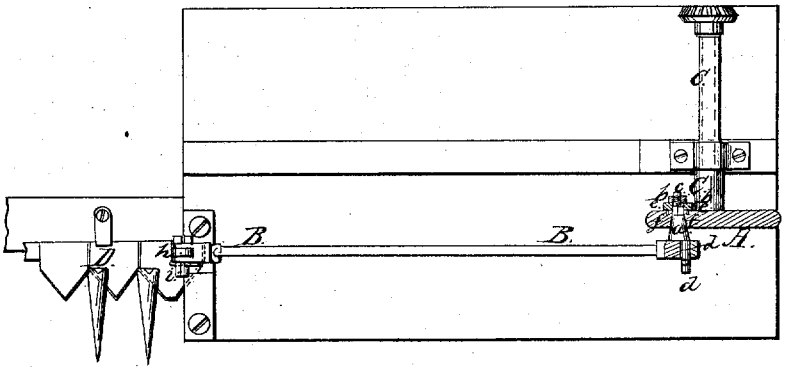

Figure 2 being a plan or top view of the same, partly in section, the plane of section being indicated by line *x x*, fig. 1.

Figures 3, 4, 5, 6, 7, and 8 are detail views, and will be hereinafter referred to.

Similar letters of reference indicate corresponding parts.

Figure 3:
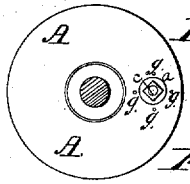
Figure 7:
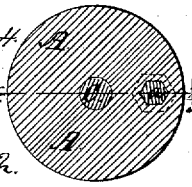
Figure 4:
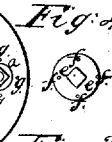
Figure 8:
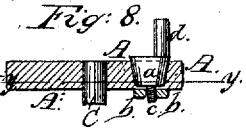
Figure 5:
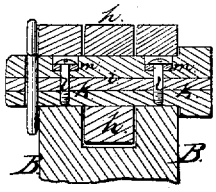
Figure 6:
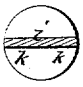

The pitman-wheel A is hung and operated in the usual manner. It is connected with the pitman B by a pin, *a*, which is shown more particularly in fig. 2. That portion of the pin *a* which passes through the wheel A is tapering, as shown, and projects towards the front, so that by drawing the nut *b*, which screws over the inner screw-end *c* of the pin *a* tight, the pin may be held secure in the wheel, and will be also prevented from rattling. The outer end *d* of the pin *a* is of smaller diameter than the tapering parts of the pin, and is set eccentrically upon the same, as shown in fig. 2. The pitman B is pivoted on this eccentric portion *d* of the pin. Between the screw end *c* and the end of the tapering part the pin is made square, and fits into a washer, *e*, which is provided with a square hole. The said washer *e* is prevented from revolving by two (more or less) pins *f*, which are secured to its inner side, and fit to appropriate holes in the inside of the wheel. Fig. 3 shows an inside view of the wheel A, which is hung on the axle C. The pin *a* is shown in this view, the washer *e* and nut *b* being removed, thus exposing the holes *g*, into which the pins of the washer fit. Fig. 4 is an inside view of the washer *e*, showing the pins *f* and the square hole into which the square portion of the pin *a* fits. It is easily understood that, by turning the pin *a*, the eccentric connecting-portion *d* of the same is brought nearer to or further from the centre C of the wheel, thereby changing the length of stroke of the cutting-bar D, which is secured to the lower end of the pitman. To turn the pin *a* in the wheel, the nut *b* must be removed. The pin is then drawn forward and replaced in a different position, or the washer *e* may also be slightly drawn back and revolved, so as to be placed in a different position. The part *a* of the eccentric pin may also be made polygonal, as shown in figs. 7 and 8, the former being a vertical sectional view through the wheel A, taken on the line *y y*, fig. 8; the latter being a horizontal sectional view of the wheel. Both views are drawn on a larger scale than figs. 1 and 2. The part *a* of the pin is polygonal, and fits into a corresponding hole in the wheel A. The pin is thus prevented from turning, and the washer *e* thus becomes superfluous. The polygonal part of the pin is pyramidal, and is also provided with a screw, *c*, on its end, so that it may be secured in any position by the nut *b*. The pitman B is connected to an upright, *h*, on the cutter-bar D, by means of the pin *i*. This pin consists of two semi-cylindrical halves, between which the packing *k* is laid. The two parts may be held together by screws *l*, the heads of which may be sunk and rest on a leaden or other packing *m*, as shown in fig. 5, which is a longitudinal section, showing the pin *i*, fig. 6 being an end view of the same. When the pin is partially worn out, more packing may be inserted, and thus the joint is always fitted well, and is kept from rattling. The pin *i* may be attached to the pitman, if desired, instead of being fitted through the same.

I claim as new, and desire to secure by Letters Patent—

1. Connecting the pitman B to the pitman-wheel A of a harvester, by means of a round or polygonal pin, *a*, having an eccentric projection, *d*, and made substantially as and for the purpose herein shown and described.

2. The tapering pin *a*, when arranged in combination with the pin *d*, the washer *e*, and nut *b*, all made and operating substantially as and for the purpose herein shown and described.

3. I claim the pin *i*, in combination with the packing *k*, all made and operating substantially as and for the purpose herein shown and described.

Witnesses:

WM. F. MCNAMARA,
A. V. BRIESEN.

HIRAM L. WANZER.